(12) United States Patent
Nakajima

(10) Patent No.: US 6,453,076 B1
(45) Date of Patent: Sep. 17, 2002

(54) EDGE ENHANCEMENT CIRCUIT

(75) Inventor: Takatsugu Nakajima, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/238,095

(22) Filed: Jan. 27, 1999

(30) Foreign Application Priority Data

Jan. 30, 1998 (JP) .......................................... 10-019577

(51) Int. Cl.[7] .............................................. H04N 1/40
(52) U.S. Cl. ...................................... 382/266; 382/199
(58) Field of Search ............................... 382/266–269, 382/199, 254, 260; 348/606, 625, 628–629; 358/409, 412, 447

(56) References Cited

U.S. PATENT DOCUMENTS

| | | | |
|---|---|---|---|
| 5,003,615 A | * | 3/1991 | Seitz ............................ 382/22 |
| 5,719,967 A | * | 2/1998 | Sekine ........................ 382/266 |
| 5,940,136 A | * | 8/1999 | Abe et al. .................... 348/537 |

FOREIGN PATENT DOCUMENTS

| | | | | |
|---|---|---|---|---|
| JP | 3-245680 | * | 11/1991 | .......... H04N/5/206 |
| JP | 5-95495 | * | 4/1993 | .......... H04N/5/206 |

* cited by examiner

*Primary Examiner*—Thomas D. Lee
*Assistant Examiner*—Stephen Brinich
(74) *Attorney, Agent, or Firm*—Frommer Lawrence & Haug LLP; William S. Frommer

(57) ABSTRACT

Disclosed herein is an edge enhancement circuit which is capable of reducing required memory capacity and power consumption. An input analog video signal HVa is sampled based on a clock signal $CLK_{H1}$, to obtain a digital video signal HVb. An edge-enhanced signal HIEa is obtained by a filter operation using the video signal HVb and its delayed signals HVc and HVd. The video signal HVa is sampled based on a clock signal $CLK_{H2}$ kept in inverse phase with the clock signal $CLK_{H1}$ to obtain a digital video signal HVe, after which its delayed signal HVf is obtained. Pixel data constituting the video signals HVf and HVc are alternately taken out based on a clock signal $CLK_{H3}$ having a frequency corresponding to that of the clock signal $CLK_{H1}$ to obtain a main-line signal HVg. The main-line signal HVg and edge-enhanced signal HIEa are respectively converted to analog signals, which in turn are added together to obtain an edge-enhanced output analog video signal HVi. Pixel data for obtaining the edge-enhanced signal are set at one-pixel intervals with respect to that about the main-line signal.

4 Claims, 6 Drawing Sheets

FIG. 2A
| | | |
|---|---|---|
| $P_{00}$ | $P_{01}$ | $P_{02}$ |
| $P_{10}$ | $P_{11}$ | $P_{12}$ |
| $P_{20}$ | $P_{21}$ | $P_{22}$ |
$NV_d$ ——
$NV_c$ ——
$NV_b$ ——
FIG. 2B
| | | |
|---|---|---|
| −1 | −1 | −1 |
| −1 | 8 | −1 |
| −1 | −1 | −1 |
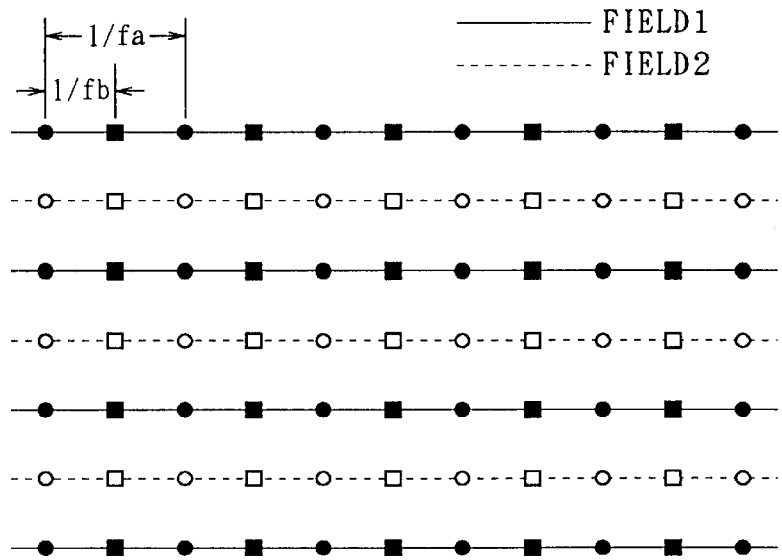
FIG. 4
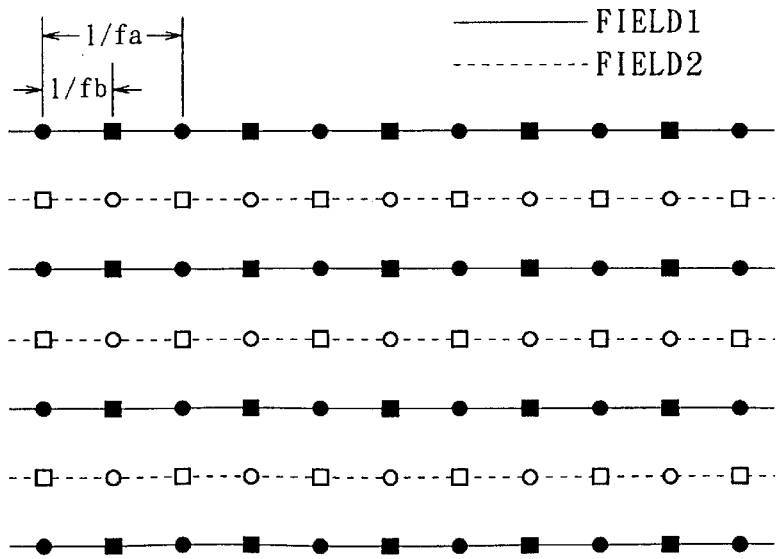
FIG. 7

——— PIXEL DATA IN FIELD 1
------ PIXEL DATA IN FIELD 2

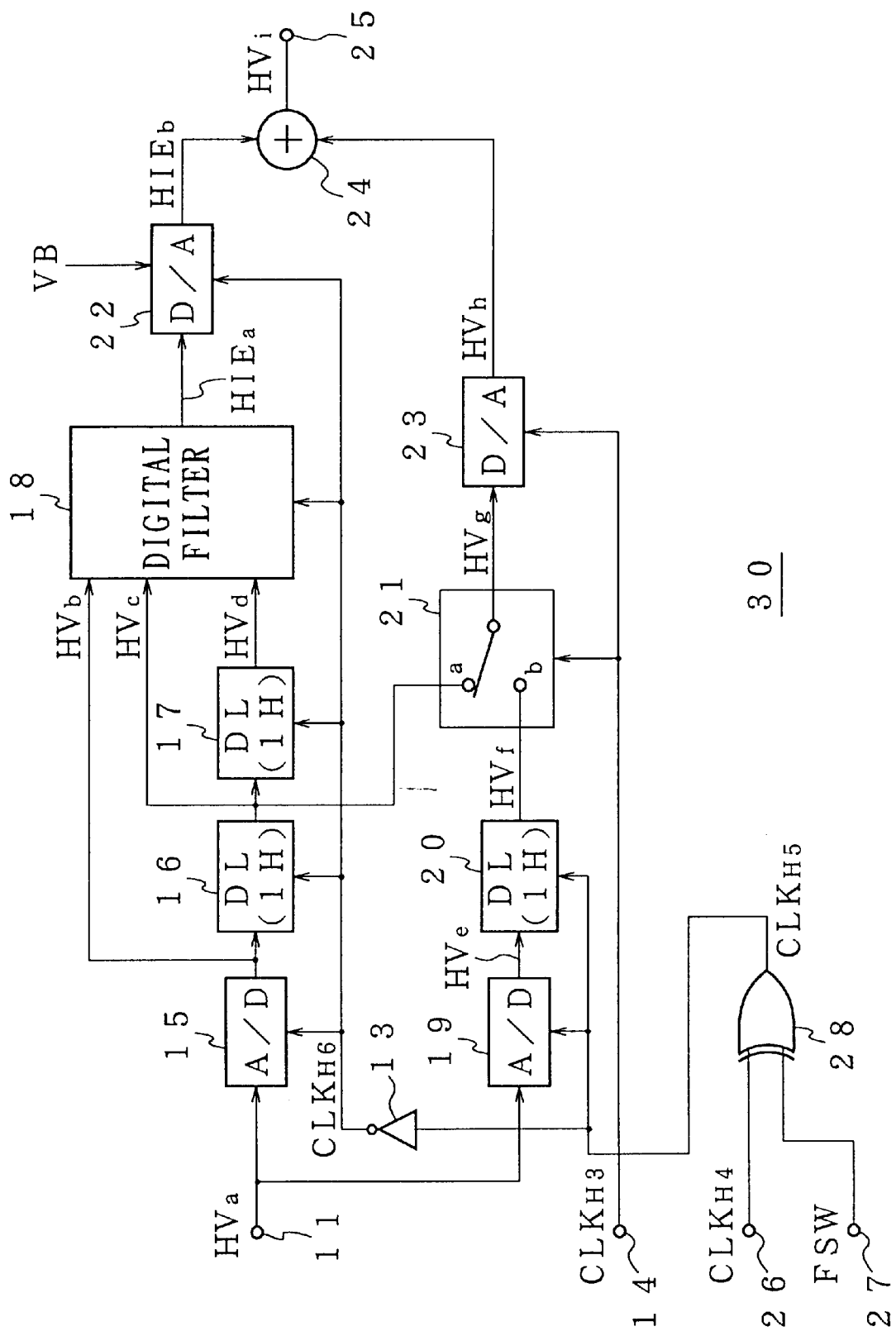

— PIXEL DATA IN FIELD 1
------ PIXEL DATA IN FIELD 2

EDGE ENHANCEMENT CIRCUIT

BACKGROUND OF THE INVENTION

1. Field of the Invention

The present invention relates to an edge enhancement circuit for enhancing the edge of an image. Specifically, this invention relates to an edge enhancement circuit wherein pixel data used for filter processing for obtaining an edge-enhanced signal are placed at one-pixel intervals with respect to pixel data about a main-line signal to thereby reduce required memory capacity and power consumption.

2. Description of the Related Art

An analog system and a digital system are known as systems for enhancing the contour or edge of an image. In the analog system, a method for separately creating edge-enhanced signals in horizontal and vertical directions and adding these edge-enhanced signals to a main-line signal has heretofore been used. It was however necessary to accurately fit the amounts of delays of the respective signals to one another and perform their adjustments using parts such as delay lines or the like.

In the digital system on the other hand, an edge-enhanced signal added to a certain pixel is determined by calculation from the difference in level between the certain pixel and each pixel lying around the certain pixel. Therefore, edge-enhanced signals including a horizontal direction, a vertical direction and a slanting direction are obtained at a time. Thus, the adjustments for accurately fitting the amounts of delays of the respective signals to one another as in the aforementioned analog system become unnecessary.

FIG. 1 shows a configuration of a digital edge enhancement circuit 100. The edge enhancement circuit 100 has a signal input terminal 101 to which an analog video signal NVa to be edge-enhanced is inputted, and a clock input terminal 102 to which a clock signal $CLK_N$ is inputted. When, in this case, the video signal NVa is an NTSC video signal, for example, the frequency of the clock signal $CLK_N$ is set to 4 fsc (fsc: chrominance sub-carrier frequency).

The edge enhancement circuit 100 also has an A/D converter 103 for sampling the analog video signal NVa, based on the clock signal $CLK_N$ to thereby obtain a digital video signal NVb, a delay line 104 for delaying the video signal NVb by one horizontal period (1H) to thereby obtain a video signal NVc, and a delay line 105 for further delaying the video signal NVc by one horizontal period (1H) to thereby obtain a video signal NVd. The delay lines 104 and 105 are respectively made up of an FIFO (first-in first-out) memory, for example.

Further, the edge enhancement circuit 100 has a digital filter 106 for performing filter processing using the video signals NVb, NVc and NVd to thereby obtain a digital edge-enhanced signal NIEa. The digital filter 106 performs the following operation to form or create the edge-enhanced signal NIEa. That is, FIG. 2A shows nine pixel data (sampled data) used for the operation. $P_{00}$, $P_{01}$ and $P_{02}$ indicate pixel data constituting the video signal NVd, $P_{10}$, $P_{11}$, and $P_{12}$ indicate pixel data constituting the video signal NVc, and $P_{20}$, $P_{21}$, and $P_{22}$ indicate pixel data constituting the video signal NVb. FIG. 2B shows operators for the respective pixel data. Here, $P_{11}$, becomes a pixel to be noted for obtaining the edge-enhanced signal NIEa. The edge-enhanced signal NIEa with respect to $P_{11}$, is determined from the following equation (1):

$$NIEa = 8 \times P_{11} - (P_{00} + P_{01} + P_{02} + P_{10} + P_{12} + P_{20} + P_{21} + P_{22}) \quad (1)$$

Moreover, the edge enhancement circuit 100 has a D/A converter 107 for converting the edge-enhanced signal NIEa to an analog signal so as to obtain an analog edge-enhanced signal NIEb, a D/A converter 108 for converting the video signal NVc outputted from the delay line 104 to an analog signal as a main-line signal so as to obtain an analog video signal NVe, an adder 109 for adding the edge-enhanced signal NIEb to the video signal NVe to thereby obtain an edge-enhanced analog video signal NVf, and a signal output terminal 110 for outputting the video signal NVf therefrom.

Incidentally, the delay lines 104 and 105, the digital filter 106, and the D/A converters 107 and 108 are supplied with the clock signal $CLK_N$ as an operating clock.

The operation of the edge enhancement circuit 100 shown in FIG. 1 will be described.

The analog video signal NVa inputted to the signal input terminal 101 is supplied to the A/D converter 103 where it is sampled based on the clock $CLK_N$ so as to be converted to the digital video signal NVb. The video signal NVb is delayed by one horizontal period by the delay line 104 to obtain the video signal NVc. The video signal NVc is further delayed by one horizontal period by the delay line 105 to obtain the video signal NVd. These video signals NVb through NVd are supplied to the digital filter 106 where the filter processing using the video signals NVb through NVd is performed to form the digital edge-enhanced signal NIEa.

Further, the video signal NVc outputted from the delay line 104 is supplied to the D/A converter 108 where it is converted to the analog signal, whereby the analog video signal NVe is obtained as the main-line signal. Similarly, the edge-enhanced signal NIEa outputted from the filter 106 is supplied to the D/A converter 107 where it is converted to the analog signal, whereby the analog edge-enhanced signal NIEb is obtained. Further, the video signal NVe and the edge-enhanced signal NIEb are supplied to the adder 109 where they are added together to obtain the edge-enhanced analog video signal NVf. The resultant video signal NVf is drawn from the adder 109 to the signal output terminal 110.

Since the frequency of the clock signal $CLK_N$ is low when the analog video signal NVa inputted to the signal input terminal 101 is an ordinary video signal such as an NTSC video signal or the like, the edge enhancement circuit 100 shown in FIG. 1 offers no problem. However, the edge enhancement circuit has a drawback in that when the analog video signal NVa is a hi-vision video signal, the frequency of the clock signal $CLK_N$ becomes high to increase the capacity of the FIFO memory constituting each of the delay lines 104 and 105, and since the basic clock used for the computation of the digital filter 106 becomes high-speed, power consumption greatly increases. When a hi-vision signal having 2200 pixels/line, for example, is edge-enhanced, the frequency of the clock signal $CLK_N$ results in 74.25 MHz. Further, the FIFO memory constituting each of the delay lines 104 and 105 needs a capacity of 2200 words ×8 bits per one (with the quantization of the A/D converter and D/A converter being performed as 8 bits) and an access speed of about 10 ns.

SUMMARY OF THE INVENTION

With the foregoing in view, it is therefore an object of the present invention to provide an edge enhancement circuit capable of reducing required memory capacity and power consumption when, for example, a hi-vision signal is edge-enhanced.

According to one aspect of the invention, for achieving the above object, there is provided an edge enhancement circuit, comprising first analog/digital converting means for sampling an input analog video signal, based on a first clock signal to thereby obtain a first digital video signal, filter processing means for filter-processing the first digital video signal to thereby obtain a digital edge-enhanced signal, second analog/digital converting means for sampling the input analog video signal, based on a second clock signal identical in frequency to the first clock signal and kept in inverse phase with each other to thereby obtain a second digital video signal, switch means for alternately taking out pixel data (sampled data) constituting the first and second digital video signals, based on a third clock signal having a frequency corresponding to twice that of the first clock signal to thereby obtain a digital main-line signal, and signal adding means for adding the signal outputted from the filter processing means to the signal outputted from the switch means to thereby obtain an edge-enhanced output video signal. Further, the edge enhancement circuit further comprises digital/analog converting means for converting the digital edge-enhanced signal to an analog edge-enhanced signal and supplying the same to the signal adding means.

According to the present invention, the input analog video signal is sampled based on the first clock signal so as to be converted to the first digital video signal. The first digital video signal is subjected to filter processing to obtain the digital edge-enhanced signal.

Further, the input analog video signal is sampled based on the second clock signal identical in frequency to the first clock signal and kept in inverse phase with the first clock signal so as to be converted to the second digital video signal. The pixel data constituting the first and second digital video signals are alternately taken out based on the third clock signal having the frequency corresponding to twice that of the first clock signal to obtain the digital main-line signal.

Since, in this case, the second clock signal is identical in frequency to the first clock signal and held in inverse phase with the first clock signal, the pixel data constituting the second digital video signal results in one sampled between the pixel data constituting the first digital video signal.

Therefore, the above-described digital main-line signal becomes equivalent to the digital video signal obtained by sampling the input analog video signal, based on the third clock signal. If the pixel data (sampled data) constituting the digital main-line signal is set as the reference, then the pixel data used for the filter processing for obtaining the above-described edge-enhanced signal are set at one-pixel intervals. Incidentally, if it is considered that while the hi-vision signal has a signal band of 30 MHz, the enhancement of the neighborhood of 20 MHz as the center is effective in improving image quality by edge enhancement, then one-pixel intervals are enough for the pixel data used for the filter processing for obtaining the edge-enhanced signal.

Further, the above-described digital main-line signal and digital edge-enhanced signal are converted to the analog signals respectively. Thereafter, they are added together to obtain the edge-enhanced output analog video signal.

When a hi-vision signal having 2200 pixels/line, for example, is edge-enhanced, the frequencies of the first and second clock signals result in 37.125 MHz respectively and the frequency of the third clock signal results in 74.25 MHz. Since, in this case, the filter processing means is activated based on the clock signal of 37.125 MHz, the required memory capacity may be ½ and power consumption is also greatly reduced, as compared with one activated based on the clock signal of 74.25 MHz.

Incidentally, the first and second clock signals may be respectively reversed in phase for each field. Thus, even if the pixel data (sampled data) used for the filter processing for obtaining the edge-enhanced signal are set at one-pixel intervals with the pixel data about the main-line signal as the reference, an edge-enhanced image whose sloping edge portion is smooth, can be obtained by an integral effect.

Typical ones of various inventions of the present inventions have been shown in brief. However, the various inventions of the present application and specific configurations of these inventions will be understood from the following description.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIGS. 2A and 2B are respectively diagrams illustrating one example of correspondences between pixel data and operators used in a digital filter;

FIG. 4 is a diagram illustrating an arrangement of pixel data (sampled data) employed in the first embodiment;

FIG. 6 is a block diagram depicting a configuration of an edge enhancement circuit according to a second embodiment of the present invention;

FIG. 7 is a diagram showing an arrangement of pixel data (sampled data) employed in the second embodiment.

DETAILED DESCRIPTION OF THE PREFERRED EMBODIMENTS

Figure 3:
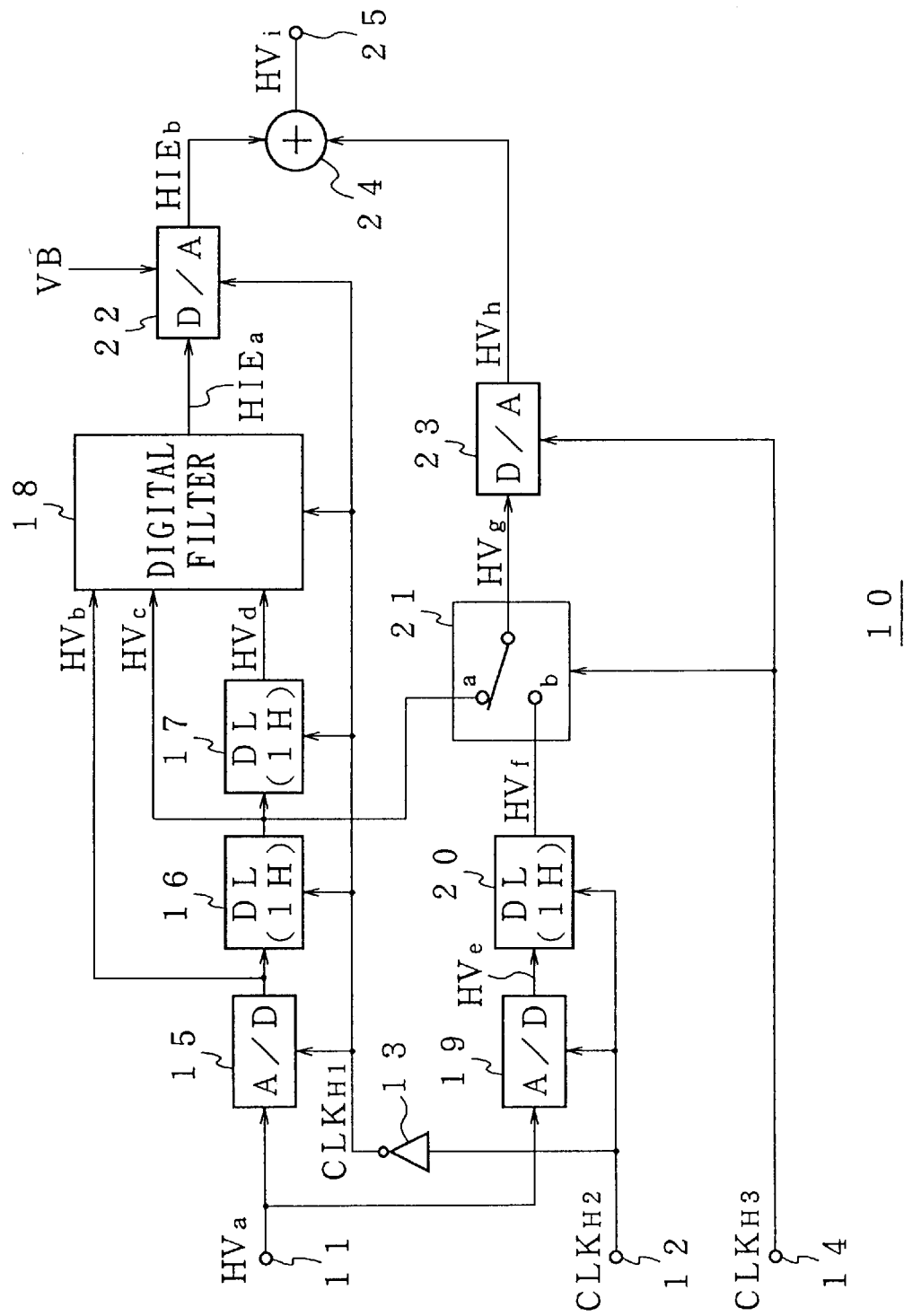
FIG. 3 is a block diagram showing a configuration of an edge enhancement circuit according to a first embodiment of the present invention.

A first embodiment of the present invention will hereinafter be described with reference to the accompanying drawings. FIG. 3 shows a configuration of an edge enhancement circuit 10 used as the first embodiment.

The edge enhancement circuit 10 has a signal input terminal 11 to which an analog video signal HVa to be edge-enhanced is inputted, a clock input terminal 12 to which a clock signal $CLK_{H2}$ defined as a second clock signal is inputted, an inverter 13 for inverting the phase of the clock signal $CLK_{H2}$ to thereby obtain a clock signal $CLK_{H1}$ defined as a first clock signal, and a clock input terminal 14 to which a clock signal $CLK_{H3}$ defined as a third clock signal having a frequency corresponding to twice that of the clock signal $CLK_{H1}$ is inputted. When, in this case, the video signal HVa is given as a hi-vision signal having 2200 pixels/line, for example, the frequencies of the clock signals $CLK_{H1}$ and $CLK_{H2}$ are respectively taken as 37.125 MHz and the frequency of the clock signal $CLK_{H3}$ is taken as 74.25 MHz. The analog video signal HVa may be a video signal obtained from an imaging device such as CCD or the like. That is, the edge enhancement circuit maybe built into a video camera.

The edge enhancement circuit 10 also has an A/D converter 15 for sampling the analog video signal HVa, based on the clock signal $CLK_{H1}$ to thereby obtain a digital video signal HVb, a delay line 16 for delaying the video signal HVb by one horizontal period (1H) to thereby obtain a video signal HVc, and a delay line 17 for further delaying the video signal HVc by one horizontal period (1H) to thereby obtain a video signal HVd. Each of the delay lines 16 and 17 is made up of an FIFO memory, for example.

Further, the edge enhancement circuit 10 has a digital filter 18 for performing filter processing using the video signals HVb, HVc and HVd to thereby obtain a digital edge-enhanced signal HIEa. While the detailed description thereof is omitted, the digital filter 18 performs computations in a manner similar to the digital filter 106 of the edge enhancement circuit 100 shown in FIG. 1 (see FIGS. 8A and 8B and see the equation (1)) to form the edge-enhanced signal HIEa.

Moreover, the edge enhancement circuit 10 has an A/D converter 19 for sampling the analog video signal HVa, based on the clock signal $CLK_{H2}$ to thereby obtain a digital video signal HVe, a delay line 20 for delaying the video signal HVe by one horizontal period (1H) to thereby obtain a video signal HVf, and a selector switch 21 for alternately extracting or taking out pixel data (sampled data) constituting the video signals HVc and HVf outputted from the delay lines 16 and 20 respectively, based on the clock signal $CLK_{H3}$ to thereby obtain a digital main-line signal HVg.

The delay line 20 is made up of an FIFO memory, for example. The video signal HVc is supplied to a fixed terminal located on the a side of the selector switch 21, whereas the video signal HVf is supplied to a fixed terminal located on the b side thereof. The selector switch 21 is electrically alternately connected to the a and b sides for each cycle of the clock signal $CLK_{H3}$ so that the digital main-line signal HVg is obtained.

Since, in this case, the clock signal $CLK_{H2}$ is identical in frequency to the clock signal $CLK_{H1}$ and they are in inverse phase with each other, the pixel data constituting the video signal HVf results in one sampled between the pixel data constituting the video signal HVc. Therefore, the above-described digital main-line signal HVg becomes equivalent to a digital video signal obtained by sampling the input analog video signal HVa, based on the clock signal $CLK_{H3}$.

FIG. 4 shows an arrangement of pixel data (sampled data) In FIG. 4, [●] and [○] indicate arrangements of fields 1 and 2 of pixel data constituting the video signal HVe respectively, whereas [■] and [□] indicate arrangements of fields 1 and 2 of pixel data constituting the video signal HVe respectively. Thus, FIG. 4 illustrates the arrangements of the fields 1 and 2 of the pixel data constituting the digital main-line signal HVg as a whole. Incidentally, fa indicates the frequency of each of the clock signals $CLK_{H1}$ and $CLK_{H2}$, whereas fb indicates the frequency of the clock signal $CLK_{H3}$.

As described above, the filter processing for obtaining the digital edge-enhanced signal HIEa is performed using the video signals HVb, HVc and HVd. However, if the pixel data constituting the digital main-line signal HVg is set as the reference, the pixel data used for the filter processing thereof are taken or set at one-pixel intervals. Incidentally, it is said that while the hi-vision signal has a signal band of 30 MHz, the enhancement of the neighborhood of 20 MHz as the center is effective in improving image quality by edge enhancement. If this point is taken into consideration, it can be then said that one-pixel intervals are enough for the pixel data used for the filter processing for obtaining the edge-enhanced signal HIEa.

Further, the edge enhancement circuit 10 has a D/A converter 22 for converting the edge-enhanced signal HIEa to an analog signal to thereby obtain an analog edge-enhanced signal HIEb, a D/A converter 23 for converting the main-line signal HVg outputted via the selector switch 21 to an analog signal to thereby obtain an analog main-line signal HVh, an adder 24 for adding the edge-enhanced signal HIEb to the main-line signal HVh to thereby obtain an edge-enhanced analog video signal HVi, and a signal output terminal 25 for outputting the video signal HVi therefrom.

Now, the D/A converter 22 has the function of adjusting or controlling the level of the edge-enhanced signal HIEb. That is, the D/A converter 22 changes a dynamic rage according to a DC voltage VB supplied from the outside to thereby adjust the level of the edge-enhanced signal HIEb.

Incidentally, the delay lines 16 and 17, the digital filter 18 and the D/A converter 22 are supplied with the clock signal $CLK_{H1}$ as an operating clock. The delay line 20 is supplied with the clock signal $CLK_{H2}$ as an operating clock. Further, the D/A converter 23 is supplied with the clock signal $CLK_{H3}$ as an operating clock.

The operation of the edge enhancement circuit 10 shown in FIG. 3 will be described.

The analog video signal HVa inputted to the signal input terminal 11 is supplied to the A/D converter 15 where it is sampled based on the clock signal $CLK_{H1}$ so as to be converted to the digital video signal HVb. Thereafter, the video signal HVb is delayed by one horizontal period by the delay line 16 to obtain the video signal HVc. Further, the video signal HVc is delayed by one horizontal period by the delay line 17 to obtain the video signal HVd. These video signals HVb through HVd are supplied to the digital filter 18 where a filter operation using the video signals HVb through HVd is performed to form the digital edge-enhanced signal HIEa.

Further, the analog video signal HVa inputted to the signal input terminal 11 is supplied to the A/D converter 19 where it is subjected to sampling based on the clock signal $CLK_{H2}$ so as to be converted to the digital video signal HVe. Thereafter, the video signal HVe is delayed by one horizontal period by the delay line 20 to obtain the video signal HVf. Since, in this case, the clock signal $CLK_{H2}$ is identical in frequency to the clock signal $CLK_{H1}$ and they are in inverse phase with each other as described above, the pixel data constituting the video signal HVf results in one sampled between the pixel data constituting the video signal HVc.

The pixel data constituting these video signals HVc and HVf are alternately taken out by the selector switch 21 based on the clock signal $CLK_{H3}$ so that the digital main-line signal HVg is obtained. The main-line signal HVg becomes one equivalent to the digital video signal obtained by sampling the input analog video signal HVa based on the clock signal $CLK_{H3}$.

Further, the main-line signal HVg outputted from the selector switch 21 is supplied to the D/A converter 23 where it is converted to the analog signal so as to obtain the analog main-line signal HVh. similarly, the edge-enhanced signal HIEa outputted from the filter 18 is supplied to the D/A converter 22 where it is converted to the analog signal so as to obtain the analog edge-enhanced signal HIEb. Thereafter, the main-line signal HVh and the edge-enhanced signal HIEb are supplied to the adder 24 where they are added together to obtain the edge-enhanced analog video signal HVi. This video signal HVi is drawn from the adder 24 to the signal output terminal 25.

When the hi-vision signal having 2200 pixels/line, for example, is edge-enhanced in the edge enhancement circuit 10 shown in FIG. 3, the frequencies of the clock signals $CLK_{H1}$ and $CLK_{H2}$ result in 37.125 MHz respectively and the frequency of the clock signal $CLK_{H3}$ results in 74.25 MHz. Therefore, since the delay lines 16 and 17 and the digital filter 18 are activated based on the clock signal of 37.125 MHz, the required memory capacity may be ½ and power consumption is greatly reduced, as compared with those activated based on the clock signal of 74.25 MHz.

In the edge enhancement circuit 10 shown in FIG. 3 on the other hand, the pixel data used for the filter processing for obtaining the edge-enhanced signal HIEa are set at one-pixel intervals as described above with the pixel data constituting the main-line signal HVg as the reference. Therefore, a drawback arises in that an unnatural edge-enhanced signal is obtained at a sloping edge portion of an image so that the sloping edge portion of the image comes into sight in aliasing step or stairstep form, thus causing an awkward image.

Figure 5A:
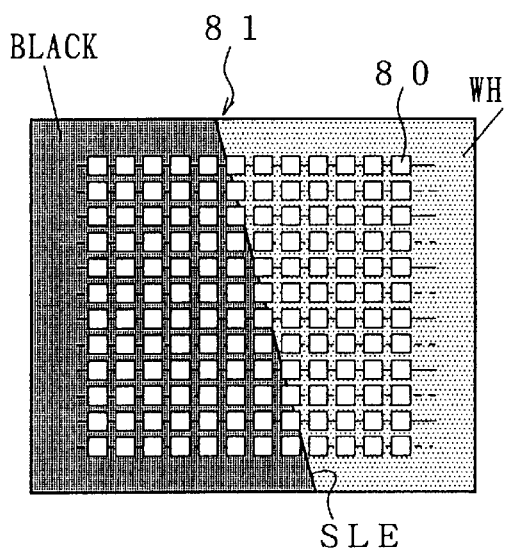
FIGS. 5A through 5E are respectively diagrams for describing the manner in which sloping edge portions of images employed in the first embodiment are seen.

A description will be made of the manner in which sloping edge portions of images edge-enhanced by the edge enhancement circuit 10 shown in FIG. 3 are seen, using FIGS. 5A through 5E. FIG. 5A shows the correspondence of an arrangement of pixel data 80 about the main-line signal HVg and a black-and-white image 81 having a sloping edge SLE, based on the main-line signal HVg.

Figure 5B:
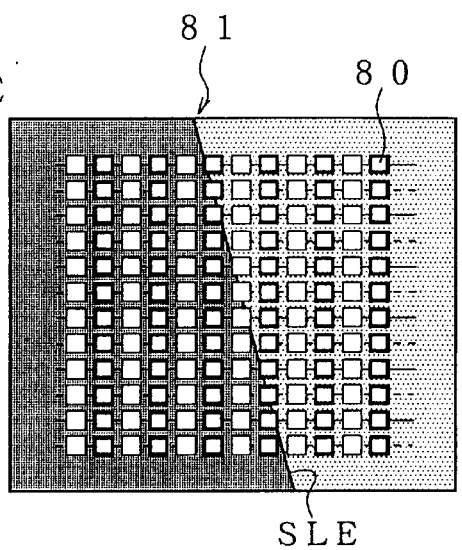
Figure 5C:
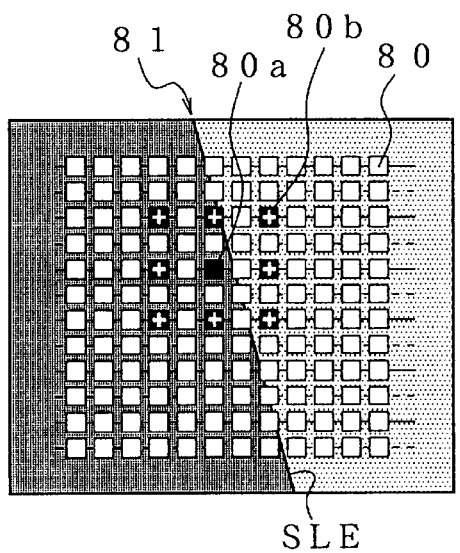

Here, the pixel data 80 used for the filter processing for obtaining the edge-enhanced signal HIEa are given at one-pixel intervals as indicated by [□] given by thick lines in FIG. 5B. The filter operation of the digital filter 18 is performed between the respective pixel data in the same field. That is, when it is desired to obtain an edge-enhanced signal HIEa for pixel data 80a to be noted as shown in FIG. 5C, eight pixel data 80b adjacent to the pixel data 80a in the upward and downward, left and right and sloping directions within the same field are used together with the pixel data 80a.

Figure 5D:
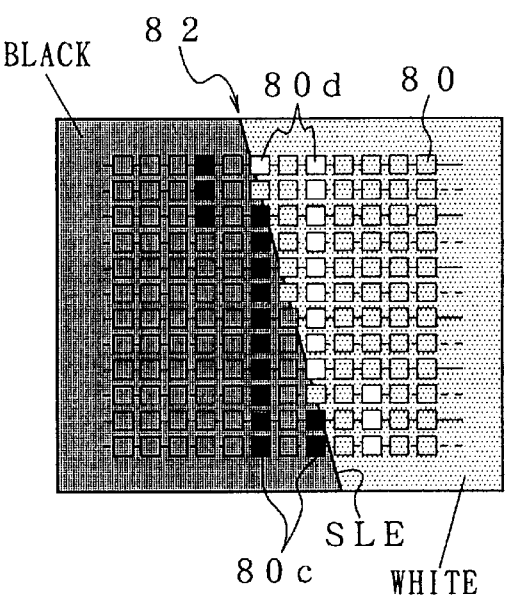
Figure 5E:
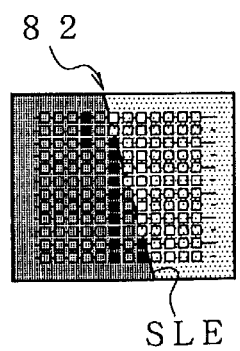

FIG. 5D typically illustrates the result of edge enhancement obtained by adding the edge-enhanced signal HIEa obtained in the above-described manner to the pixel data 80 about the main-line signal HVg. Now, pixel data 80c (illustrated by [■]) are changed to data lying on the blacker side, whereas pixel data 80d (illustrated by [□]) are changed to data lying on the whiter side. Thus, an edge-enhanced image 82 is formed so that a portion corresponding to a sloping edge SLE is seen in aliasing step form as shown in FIG. 5E as viewed on a macro basis.

FIG. 6 shows a configuration of an edge enhancement circuit 30 defined as a second embodiment of the present invention. The present edge enhancement circuit 30 intends to solve the drawback produced in the above-described edge enhancement circuit 10 shown in FIG. 3, i.e., the drawback that the sloping edge portion is viewed in aliasing step form by the edge enhancement. In FIG. 6, portions corresponding to those shown in FIG. 3 are identified by the same reference numerals and their detailed description will be omitted.

The edge enhancement circuit 30 has a clock input terminal 26 for inputting a clock signal $CLK_4$ having a frequency corresponding to one-half that of a clock signal $CLK_{H3}$ inputted to a clock input terminal 14, an input terminal 27 for inputting a field switch signal FSW alternately brought to a high level [H] and a low level [L] every fields, and an exclusive OR circuit (hereinafter called [EX-OR circuit]) 28 for XORing the clock signal $CLK_{H4}$ inputted to the clock input terminal 26 and the field switch signal FSW inputted to the input terminal 27 to thereby obtain a clock signal $CLK_{H5}$.

The clock signal $CLK_{H5}$ outputted from the EX-OR circuit 28 results in one obtained by inverting the phase of the clock signal $CLK_{H4}$ for each field. The clock signal $CLK_{H5}$ is supplied to an A/D converter 19 and a delay line 20 as an operating clock. Further, the clock signal $CLK_{H5}$ is supplied to an inverter 13. A clock signal $CLK_{H6}$ outputted from the inverter 13 is supplied to an A/D converter 15, delay lines 16 and 17, a digital filter 18 and a D/A converter 22 as an operating clock.

Figure 1:
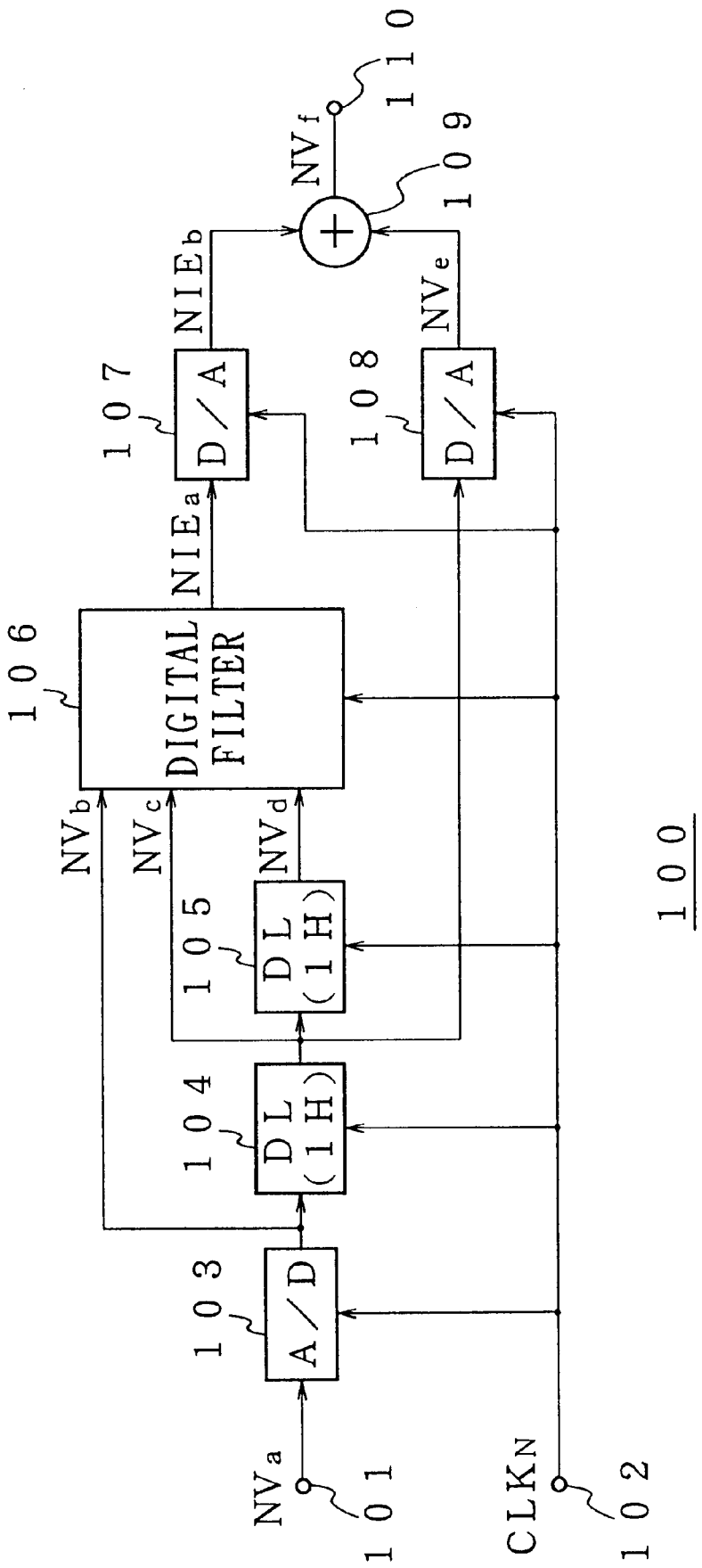
FIG. 1 is a block diagram showing one example of a digital edge enhancement circuit.

The edge enhancement circuit 30 is constructed as described above and is constructed in a manner similar to the edge enhancement circuit 10 shown in FIG. 1 in other points. The edge enhancement circuit 30 uses the clock signals $CLK_{H5}$ and $CLK_{H6}$ kept in inverse phase with each other in the same manner as described above as an alternative to the clock signals $CLK_{H1}$ and $CLK_{H2}$ kept in inverse phase with each other, which are used in the edge enhancement circuit 10 shown in FIG. 3. Thus, the present edge enhancement circuit 30 basically operates in a manner similar to the edge enhancement circuit 10 shown in FIG. 1 and can obtain operation and effects similar to the above.

Since the phases of the clock signals $CLK_{H5}$ and $CLK_{H6}$ are respectively inverted every fields in the edge enhancement circuit 30 shown in FIG. 6, sampling phases in the A/D converters 15 and 19 are 180° out of phase with each other between fields 1 and 2. FIG. 7 shows an arrangement of pixel data (sampled data) In FIG. 7, [●] and [○] respectively indicate arrangements of the fields 1 and 2 of pixel data constituting a video signal HVb, whereas [■] and [□] respectively indicate arrangements of the fields 1 and 2 of pixel data constituting a video signal HVe. Thus, FIG. 7 illustrates, as a whole, an arrangement of the fields 1 and 2 of pixel data constituting a digital main-line signal HVg. Incidentally, fa indicates the frequencies of the clock signals $CLK_{H5}$ and $CLK_{H6}$, and fb indicates the frequency of the clock signal $CLK_{H3}$.

Thus, the edge enhancement circuit 30 shown in FIG. 6 can solve the drawback that since the phases of the pixel data used for the filter arithmetic processing are 180° out of phase with each other in the fields 1 and 2, each sloping edge portion is seen in the aliasing step form due to the edge enhancement.

Figure 8A:
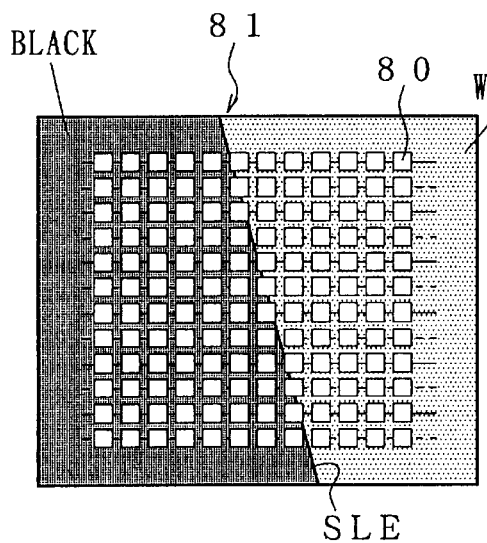
FIGS. 8A through 8E are respectively diagrams for describing the manner in which sloping edge portions of images employed in the second embodiment are seen.

A description will be made of how sloping edge portions of images edge-enhanced by the edge enhancement circuit 30 shown in FIG. 6 are seen, with reference to FIGS. 8A through 8E. FIG. 8A shows the correspondence of an arrangement of pixel data 80 about the main-line signal HVg and a black-and-white image 81 having a sloping edge SLE, based on the main-line signal HVg.

Figure 8B:
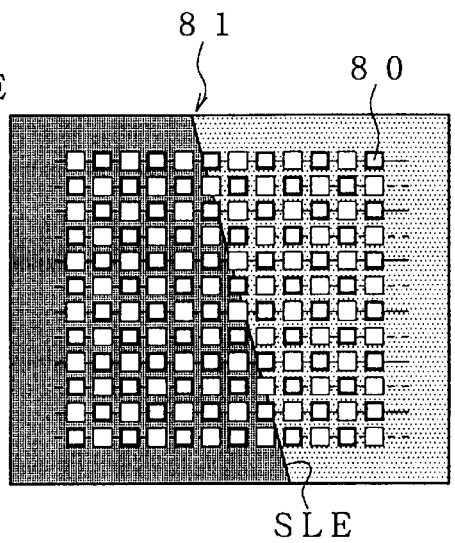
Figure 8C:
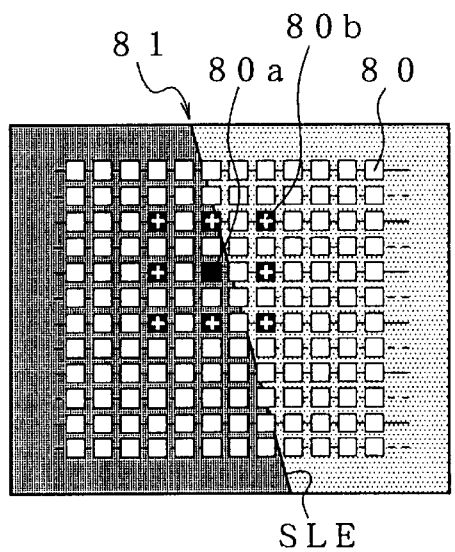

Here, the pixel data 80 used for the filter processing for obtaining the edge-enhanced signal HIEa are given at one-pixel intervals as indicated by [□] given by thick lines in FIG. 8B and are shifted by 180° in sampling phase in fields 1 and 2. A filter computation of the digital filter 18 is performed between the respective pixel data in the same field. That is, when it is desired to obtain an edge-enhanced signal HIEa for pixel data 80a to be noted as shown in FIG. 8C, eight pixel data 80b adjacent to the pixel data 80a in the upward and downward, left and right and sloping directions within the same field are used together with the pixel data 80a.

Figure 8D:
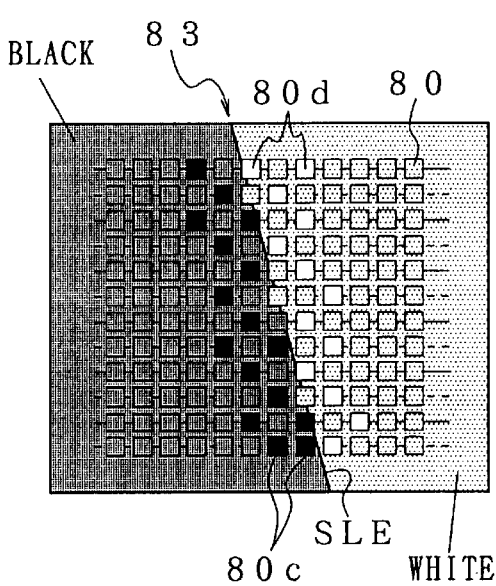
Figure 8E:
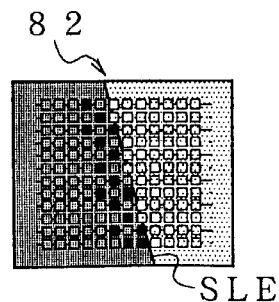

FIG. 8D typically illustrates the result of edge enhancement obtained by adding the edge-enhanced signal HIEa obtained in the above-described manner to the pixel data 80 about the main-line signal HVg. Now, pixel data 80c (illustrated by [■]) are changed to data lying on the blacker side, whereas pixel data 80d (illustrated by [□]) are changed to data lying on the whiter side. Thus, an edge-enhanced image 82 is formed so that the manner in which a portion corresponding to a sloping edge SLE is seen in stepped form, becomes smooth as shown in FIG. 8E as viewed on a macro basis.

Incidentally, the example (see the equation (1)) of the operation performed by the digital filter 18 for obtaining the above-described edge-enhanced signal HIEa is illustrated as one example. It is needless to say that the present invention is not limited to this.

According to the edge enhancement circuit described above, pixel data used for filter processing for obtaining an edge-enhanced signal are set at one-pixel intervals with respect to pixel data about a main-line signal. Thus, required memory capacity and power consumption can be reduced. Since filter processing means is activated at a clock signal of 37.125 MHz when a hi-vision signal having 2200 pixels/line, for example is edge-enhanced, the required memory capacity may be ½ and the power consumption can be greatly reduced, as compared with one which operates at a clock signal of 74.25 MHz. Further, the pixel data used for the filter processing for obtaining the edge-enhanced signal are shifted by 180° in sampling phase every fields. Thus, even if the pixel data used for its filter processing are set at one-pixel intervals with the pixel data about the main-line signal as the reference, an edge-enhanced image whose sloping edge is smooth, can be obtained by an integral effect.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. An edge enhancement circuit, comprising:

first analog/digital converting means for sampling an input analog video signal, based on a first clock signal to thereby obtain a first digital video signal;

filter processing means for filter-processing the first digital video signal to thereby obtain a digital edge-enhanced signal;

second analog/digital converting means for sampling the input analog video signal, based on a second clock signal having a frequency identical to that of the first clock signal and in inverse phase with respect to the first clock signal to thereby obtain a second digital video signal;

switch means for alternately taking out pixel data constituting the first and second digital video signals, based on a third clock signal having a frequency corresponding to twice that of the first clock signal to thereby obtain a digital main-line signal; and signal adding means for adding the signal outputted from said filter processing means to the signal outputted from said switch means to thereby obtain an edge-enhanced output video signal.

2. The edge enhancement circuit according to claim 1, further comprising digital/analog converting means for converting the digital edge-enhanced signal to an analog edge-enhanced signal and supplying the same to said signal adding means, said digital/analog converting means having the function of adjusting the level of the analog edge-enhanced signal.

3. The edge enhancement circuit according to claim 1, wherein the phase of said first and second clock signals are reversed in successive fields.

4. An imaging device, comprising:

imaging means;

first analog/digital converting means for receiving an analog video signal outputted from said imaging means and sampling the input analog video signal, based on a first clock signal to thereby obtain a first digital video signal;

filter processing means for filter-processing the first digital video signal to thereby obtain a digital edge-enhanced signal;

second analog/digital converting means for sampling the input analog video signal, based on a second clock signal having a frequency identical to that of the first clock signal and in inverse phase with respect to the first clock signal to thereby obtain a second digital video signal;

switch means for alternately taking out pixel data constituting the first and second digital video signals, based on a third clock signal having a frequency corresponding to twice that of the first clock signal to thereby obtain a digital main-line signal; and signal adding means for adding the signal outputted from said filter processing means to the signal outputted from said switch means to thereby obtain an edge-enhanced output video signal.

* * * * *